(No Model.)
D. A. WOODBURY.
CRANKED SHAFT
No. 344,930. Patented July 6, 1886.
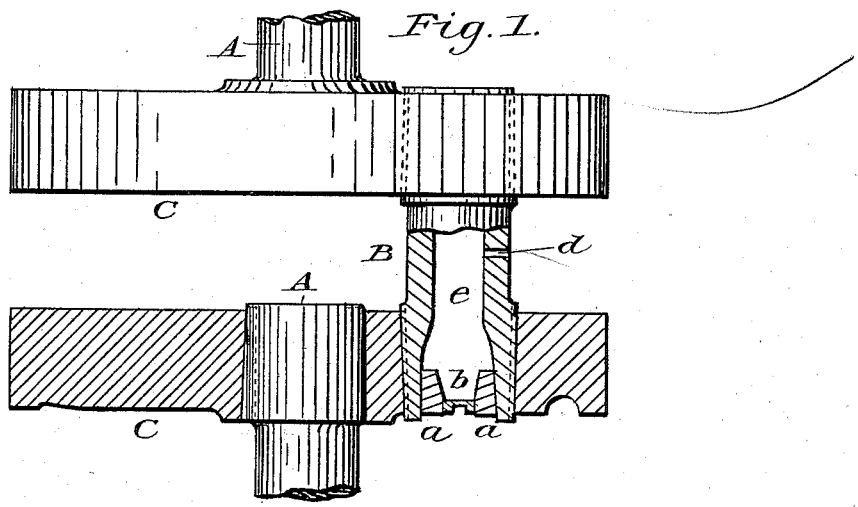
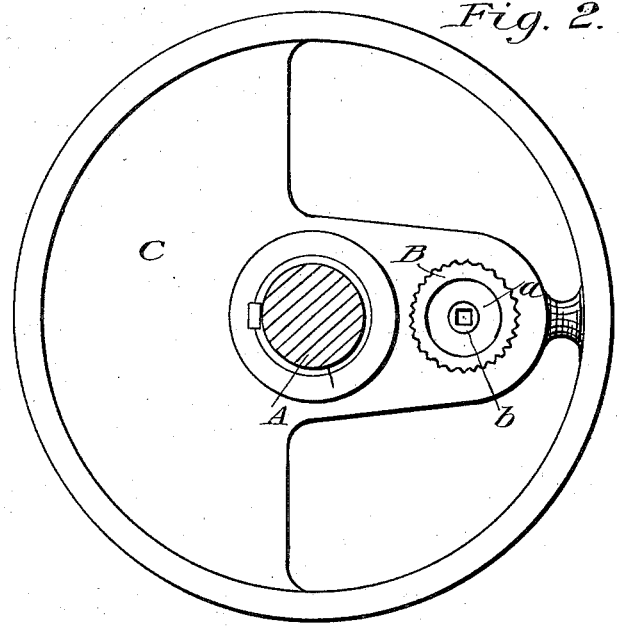
Witnesses:
H. J. Creelman.
Henry B. Howe.
Inventor,
D. A. Woodbury

UNITED STATES PATENT OFFICE.

DANIEL A. WOODBURY, OF ROCHESTER, NEW YORK.

CRANKED SHAFT.

SPECIFICATION forming part of Letters Patent No. 344,930, dated July 6, 1886.

Application filed October 19, 1885. Serial No. 180,375. (No model.)

*To all whom it may concern:*

Be it known that I, DANIEL A. WOODBURY, a citizen of the United States, residing in the city of Rochester, in the county of Monroe and State of New York, have invented a new and useful Improvement in Cranked Shafts, of which the following is a specification.

My invention relates to improvements in shafts with multiple cranks, and has for its objects to provide a more convenient and effective method of securing the pin in the cranks.

The drawings illustrate the application of my invention to what is known as a "double-wheel" crank. It is also applicable to triple and almost any form of multiple cranks, and to many other similar purposes.

In the drawings, Figure 1 is a plan of the shaft, with one of the wheels or cranks and a part of the pin shown in section through the center; Fig. 2, an end view.

The pin B is made of steel casting or other suitable metal, and is cored out or bored through the center to form the chamber $e$, of about half the diameter of the pin. This chamber is enlarged at the ends to compensate for the increase in the diameter of the pin, and to reduce the thickness of the metal as it recedes from the points exposed to the greatest strain. This provides a tapering hole to receive the rings $a$. The outside of the ends of the crank-pin also is tapered slightly from the shoulders of the journal outwardly. The journal of the pin is turned and finished in a lathe, and the ends are planed or milled to a true taper and grooved or ridged from the shoulder out. These grooves may be of any suitable form or size, and need not necessarily be uniform, but must be smooth and straight throughout on lines converging toward a common point.

The wheels or cranks are made of iron casting, and the pin thus prepared is set in the mold and the metal cast around it, provision being made to place it truly in its relations to the cranks. Should there be any slackness, due to the difference in the shrinkage of the metals in cooling, it can be easily remedied by forcing the pin a little farther into the crank, the surface of the pin and the shape of the matrix formed by it in the casting being such that the pin will move in a straight line. The metal at the outer end of the pin, being thinnest, will be most affected, and the ring or hollow plug $a$ is provided and driven in until it expands it sufficiently to fit tightly. As a precaution against the parts working loose, the projecting ends of the pin should be riveted down a little against the cranks and the end of the rings. The shaft might be cast into the crank in the same manner; but the mass of metal in the shaft is so much greater as to chill the iron too quickly, endangering the casting, and preventing the turning of suitable shoulders to work against the journal-boxes. As shown, the crank is bored out to receive the shaft or shafts, care being taken to bore it on a line perfectly parallel with the journal of the pin. It is better to turn the shaft and wheels after they are keyed together, enabling any defects in the fitting or keying of the shafts to be corrected. When the shaft is to do most of its work at one end, that exposed to the least strain may be made of cast-iron and cast in one piece with the crank, thereby saving labor and expense. As the grooves or ridges upon the surface of the pin hold in so many directions, the boss around the pin may be made lighter than that receiving the shaft, which must resist the strain of keying. This lessens the weight to be counterbalanced. The plugs $b$ are fitted into the rings $a$, thereby inclosing the chamber $e$, which is intended to be kept filled with tallow or other suitable lubricating material, to melt in case of heating, and, flowing out through the opening $d$, lubricate the pin.

What I claim as my invention, and desire to secure by Letters Patent, is—

1. In a cranked shaft, a crank-pin properly fitted, cast into the cranks, the ends of the pin being grooved or ridged, substantially as shown and described, and for the purpose set forth.

2. In a cranked shaft having the crank-pin made hollow and cast into the cranks, the rings or plugs $a$, substantially as and for the purpose described.

3. In a cranked shaft, the chamber $e$, in combination with pin B, having one or more openings, $d$, all constructed and operating substantially as set forth.

D. A. WOODBURY.

Witnesses:
 W. J. CREELMAN,
 HENRY B. HOWE.